(No Model.)
J. P. STABLER.
RAKE.
No. 320,597. Patented June 23, 1885.
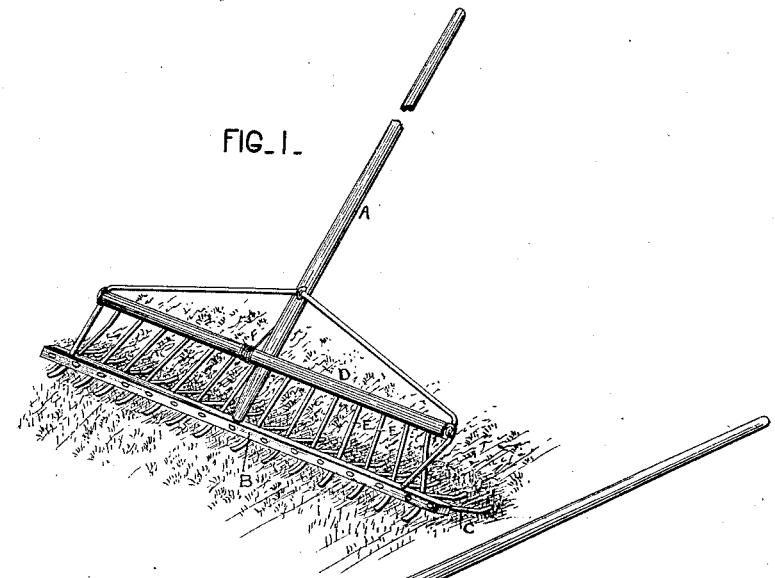
FIG. 1.
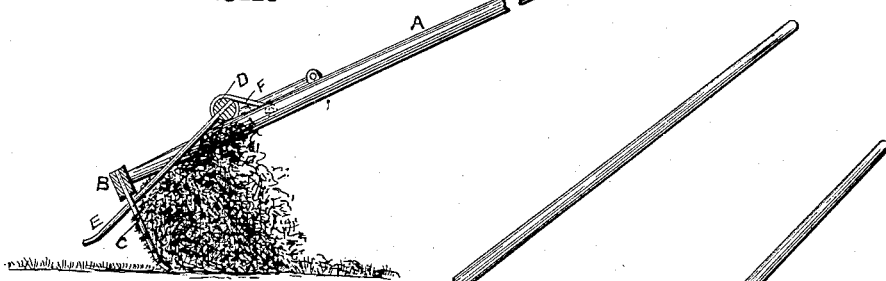
FIG. 2.
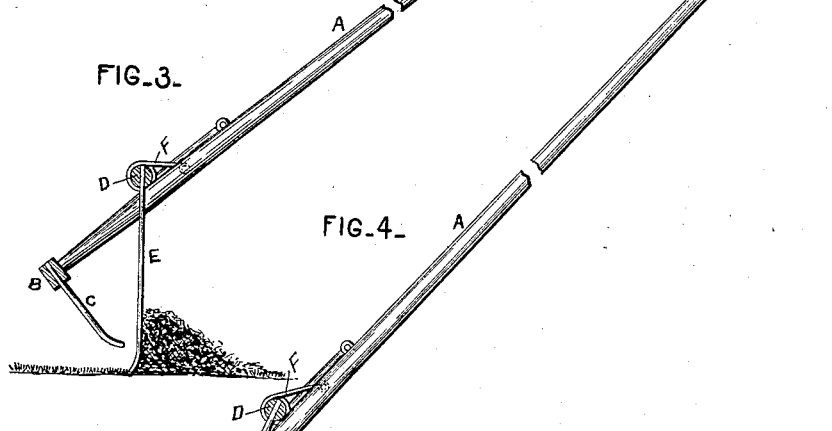
FIG. 3.
FIG. 4.
WITNESSES:
Wm. T. Gill
Willie G. Anderson
INVENTOR
James P. Stabler
BY R. D. Smith
his
ATTORNEY

UNITED STATES PATENT OFFICE.

JAMES P. STABLER, OF SANDY SPRING, MARYLAND.

RAKE.

SPECIFICATION forming part of Letters Patent No. 320,597, dated June 23, 1885.

Application filed May 8, 1885. (No model.)

*To all whom it may concern:*

Be it known that I, JAMES P. STABLER, of Sandy Spring, in Montgomery county, in the State of Maryland, have invented new and useful Improvements in Rakes, particularly adapted to use as lawn-rakes, which require long and closely-set teeth, and are correspondingly difficult to keep clean, because the leaves and trash which the rake is used to gather up become wedged and tangled with the teeth and require forcible removal. This, too, is of frequent recurrence and is quite troublesome.

I am aware that rakes have heretofore been provided with cleaning devices, and therefore I do not propose to claim, broadly, a device for that purpose; but I am not aware that any device has been applied to the rake of ordinary construction to be put into action to clean the teeth without subjecting the rake to unusual movements. For instance, I am aware that a rake-head has been hinged to the handle, so that at will the teeth can be turned outward in line with the handle to discharge their load. I am also aware that a rake-head has been attached to the rake-handle by a long spring, and that a cleaner-plate has been attached rigidly to the handle, so that by pressing downward when the points of the teeth rest upon the ground the spring would yield and the cleaner-plate would descend to the point of the teeth and remove any adhering débris. I am also aware that a cleaner has been mounted above the rake-head by means of a long spring attached to the back of the rake-handle, so that by turning the rake over upon its back and pressing downward upon the spring the cleaner might be caused to pass along the teeth toward their points and discharge the débris; but these all involve structures which are in themselves objectionable, and which require unusual motions on the part of the rake.

My invention consists of a rocking head hinged parallel to the rake-head and crossing the handle, provided with a set of fingers projecting between and beyond the rake-teeth, and provided with a light spring capable of holding said rocking head in its proper position.

Reference is had to the accompanying drawings, wherein Figure 1 is a perspective view of my rake. Fig. 2 is an elevation representing my rake in action. Fig. 3 is an elevation representing the act of discharging. Fig. 4 is an elevation representing the cleaners acting as gages.

A is the rake-handle. B is the rake-head. C C are the rake-teeth. These may be of any preferred pattern or style.

D is a rocking head hinged to the rake-handle, to the handle-brace, or the brackets extending from the head or from the handle. Said head D is provided with a series of long fingers, E, with the free ends turned upward, and a spring, F, to retain the parts in place; but said spring is preferably only strong enough to sustain the fingers E, because it is desirable that they shall move easily when required to clean the teeth C. The use of this cleaner does not involve any unusual movements of the rake. The ordinary forward and backward movements comprise all that is required.

In drawing the rake toward the operator to gather its load, as shown in Fig. 1, the fingers E rest against the under side of the rake-head and form a guard to prevent the débris from piling upon and falling over the rake-head. The rake is therefore able to gather a larger load without overflowing than would otherwise be possible, and consequently does cleaner work. When the load has been drawn to the place of discharge, a push of the rake, with a slightly increased upward inclination of the handle, will cause the free ends of the fingers E to engage with the ground. The continued movement of the rake in the same direction causes it then to ride upon the fingers E, as shown in Fig. 3, and the rake-teeth are thereby cleaned. The spring F yields sufficiently to let the fingers drag behind as the rake is pushed, sliding upon its teeth. A slight lift from the ground or a movement of the rake toward the operator causes them to return to their initial position.

It is sometimes desirable to so hold the rake that the backs of the teeth will slide along on the ground, because otherwise the points of the teeth would be liable to catch and penetrate tufts of grass, tangled weeds, or other unevennesses of surface or obstructions; but it is frequently difficult to guide the teeth with desirable regularity, and at such times, by elevating the rake-handle so that the extremities of the fingers E rest upon the ground, as in Fig. 4, they act as gages to prevent the ends of the teeth C from penetrating too deeply. This method of use is frequently highly desirable and convenient.

Having described my invention, I claim—

1. A rake, A B C, combined with a rocking head, D, hinged parallel to the rake-head B and crossing the handle A, and provided with the cleaner-fingers E, which project therefrom between and beyond the rake-teeth C and constitute a combined guard and cleaner, as set forth.

2. A rake, A B C, combined with a hinged cleaner the fingers whereof project between and beyond the rake-teeth C and terminate at a point where a slight elevation of the rake-handle will cause said fingers to engage the ground, as set forth.

3. A rake, A B C, combined with a cleaner the fingers whereof project beyond the rake-teeth and are adapted to act as gages to prevent the teeth C from penetrating the ground too deeply.

4. A rake, A B C, combined with a cleaner, D E, hinged to the rake-handle brace, and a spring, F, connected at one end to said handle and at the other end to the rocking head D, as and for the purpose set forth.

JAMES P. STABLER.

Witnesses:
R. D. O. SMITH,
WM. T. GILL.